(12) United States Patent
Okita

(10) Patent No.: US 7,170,482 B2
(45) Date of Patent: Jan. 30, 2007

(54) COLOR DISPLAY DEVICE AND METHOD

(76) Inventor: Masaya Okita, 621-6, Suzuya 2-chome, Saitama-shi, Saitama 338-0013 (JP)

( * ) Notice: Subject to any disclaimer, the term of this patent is extended or adjusted under 35 U.S.C. 154(b) by 49 days.

(21) Appl. No.: 10/297,782

(22) PCT Filed: Jun. 7, 2001

(86) PCT No.: PCT/JP01/04813

§ 371 (c)(1),
(2), (4) Date: Jan. 5, 2003

(87) PCT Pub. No.: WO01/95303

PCT Pub. Date: Dec. 13, 2001

(65) Prior Publication Data

US 2004/0027677 A1 Feb. 12, 2004

(30) Foreign Application Priority Data

Jun. 7, 2000 (JP) .............................. 2000-170085

(51) Int. Cl.
*G09G 3/36* (2006.01)

(52) U.S. Cl. .............................. 345/88; 345/90; 345/99

(58) Field of Classification Search ................ 345/88, 345/97, 90, 99; 348/70, 268
See application file for complete search history.

(56) References Cited

U.S. PATENT DOCUMENTS

| | | | | |
|---|---|---|---|---|
| 4,758,818 A | * | 7/1988 | Vatne | 345/697 |
| 5,977,942 A | * | 11/1999 | Walker et al. | 345/97 |
| 6,147,720 A | * | 11/2000 | Guerinot et al. | 348/744 |
| 6,392,656 B1 | * | 5/2002 | Someya et al. | 345/589 |
| 6,801,213 B2 | * | 10/2004 | Bergstrom et al. | 345/596 |
| 6,803,894 B1 | * | 10/2004 | Hirota et al. | 345/88 |
| 2004/0196253 A1 | * | 10/2004 | Eichenlaub | 345/102 |
| 2005/0185148 A1 | * | 8/2005 | Davis et al. | 353/84 |
| 2005/0225545 A1 | * | 10/2005 | Takatori et al. | 345/204 |

OTHER PUBLICATIONS

"liquid crystal display." Encyclopædia Britannica. 2004. Encyclopædia Britannica Premium Service. Nov. 24, 2004 <http://www.britannica.com/eb/article?tocId=9126254>.*

* cited by examiner

*Primary Examiner*—Kee M. Tung
*Assistant Examiner*—Chante Harrison
(74) *Attorney, Agent, or Firm*—Flynn, Thiel, Boutell & Tanis, P.C.

(57) ABSTRACT

The color display according to the invention relates to a color display device and a color display method for color display by monochromatic display of data of respective colors in synchronism with sequential ON/OFF switching of three light sources for red, green and blue, respectively. In a preferred embodiment, the red, green and blue light sources are controlled to turn on and off in the order of red, green, blue and green in each unit period and to repeat the unit period.

28 Claims, 2 Drawing Sheets

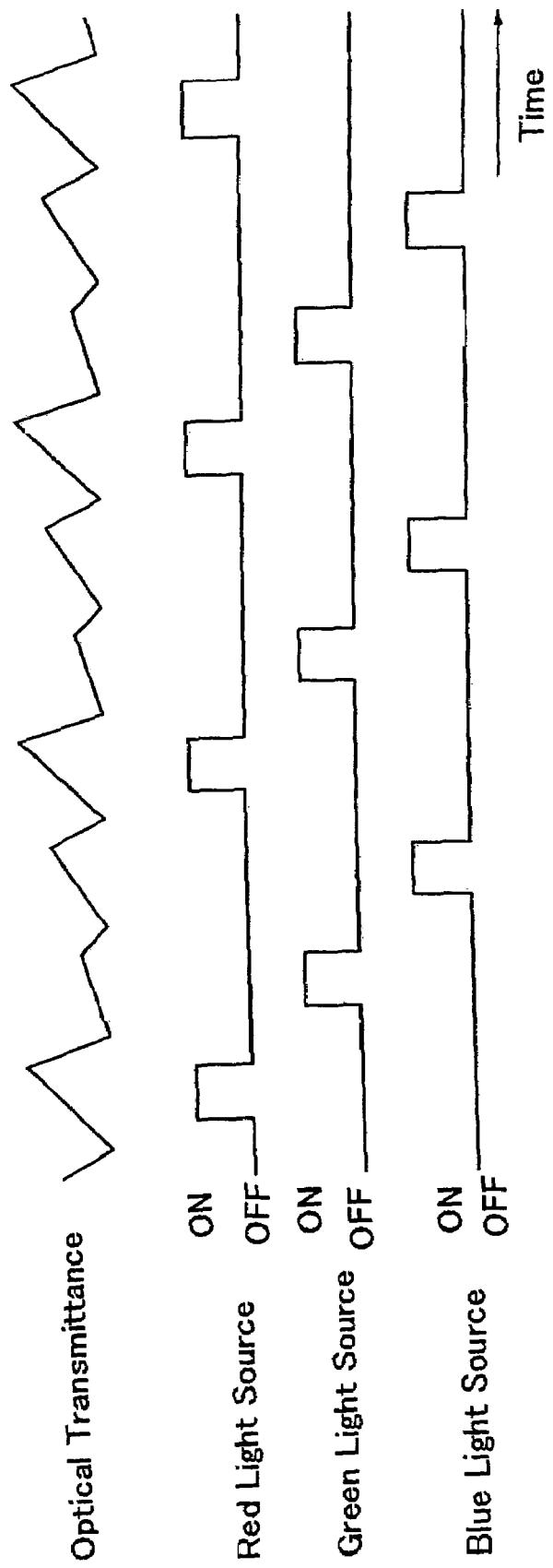

COLOR DISPLAY DEVICE AND METHOD

TECHNICAL FIELD

This invention relates to a color display device and a color display method for representation of colors without using color filters, especially suitable for application to a field sequential system to represent colors by high-speed switching of three colored light sources of red, green and blue.

BACKGROUND ART

The field sequential color display method is a typical known method for displaying colors, i.e. representation of colors, without using color filters. The field sequential system uses three colored light sources of red, green and blue, and monochromatic display elements to represent colors by switching three colored light sources at a high speed and synchronously displaying data with monochromatic display elements. Monochromatic display elements may be either reflection-type elements or transmission-type elements.

Color display devices of the field sequential type not using color filters are applied to liquid crystal displays. Further, field sequential projectors have been realized as commercially viable products because of some advantages, such as enabling a single-panel projector to attain a resolution equivalent to that of a three-panel projector not using the field sequential system, and simplifying the optical system. Furthermore, field sequential color display devices have been reported to be applied also to head-mounted displays that users can directly wear on their eyes because a compact and high-resolution color representation is possible.

In existing field sequential color display methods, red, green and blue light sources are sequentially turned ON and OFF at equal frequencies as shown in FIG. 2. For example, a round of lighting red→green→blue makes a unit period, and the unit period is repeated.

A color display method not using color filters, such as a field sequential system, needs display elements that can be switched very quickly. However, display elements tend to degrade in response when they are enhanced in resolution and enlarged in operative temperature range. Therefore, from the standpoint of the display elements, the switching cycle is preferably longer.

Regarding color display devices using the field sequential system, it is generally appreciated that users will sense flickers unless the ON/OFF frequency of each light source among red, green and blue light sources is shorter than 1/60 second. This means that individual display elements must be switched at a frequency shorter than 1/180 second, and this is against the requirement of a longer switching cycle as explained above.

It is therefore an object of the invention to provide a color display method and a color display device capable of preventing the problem of flickers even under a longer switching cycle of display elements.

A further object of the invention is to provide a color display method and a color display apparatus with which users are unlikely to sense flickers from color representation under the same switching cycle of display elements.

A still further object of the invention is to provide a color display method and a color display apparatus that can remove user-conscious flickers from field sequential color representation, even under a relatively long switching cycle of display elements.

DISCLOSURE OF INVENTION

Those objects can be accomplished by various aspects of the invention. According to the first aspect of the invention, there is provided a color display device for color display by using in combination ON/OFF switching of light sources for red, green and blue three colors with display elements for displaying data of respective colors in synchronism with the ON/OFF switching of said three color light sources, comprising: the green light source being turned on and off twice in a period after the red light source is turned on and before the light source is next turned on.

According to a further aspect of the invention, there is provided a color display device for color display by using in combination ON/OFF switching of light sources for red, green and blue three colors with display elements for displaying data of respective colors in synchronism with the ON/OFF switching of said three color light sources, comprising: the green light source being turned on and off twice in a period after the blue light source is turned on and before the blue source is next turned on.

According to a still further aspect of the invention, there is provided a color display device for color display by using in combination ON/OFF switching of light sources for red, green and blue three colors with display elements for displaying data of respective colors in synchronism with the ON/OFF switching of said three color light sources, comprising: the red, green and blue light sources being controlled to turn on and off in the order of red, green, blue and green in each unit period and to repeat the unit period.

In the unit period of the ON/OFF switching of the red, green and blue light sources, they may be turned on and off in the order of blue, green, red and green, or in the order of green, blue, green and red, or in the order of green, red, green and blue.

According to a yet further aspect of the invention, there is provided a color display method for color display by controlling display elements to display data of respective colors in synchronism with ON/OFF switching of light sources for red, green and blue three colors, comprising: turning on the green light source twice in a period after the red light source is turned on and before the red light source is next turned on.

According to a yet further aspect of the invention, there is provided a color display method for color display by controlling display elements to display data of respective colors in synchronism with ON/OFF switching of light sources for red, green and blue three colors, comprising: turning on the green light source twice in a period after the blue light source is turned on and before the blue light source is next turned on.

According to a yet further object of the invention, there is provided a color display method for color display by controlling display elements to display data of respective colors in synchronism with ON/OFF switching of light sources for red, green and blue three colors, comprising: turning the green light source twice in a period after the blue light source is turned on and before the blue light source is next turned on.

In any of the above-summarized methods, the unit period of turning the red, green and blue light sources on and off may be ON/OFF switching of blue, green, red and green, ON/OFF switching of green, blue, green and red, or ON/OFF switching of green, red, green and blue.

BRIEF DESCRIPTION OF DRAWINGS

FIG. 2 is a diagram that shows changes of optical transmittance of display elements and ON/OFF actions of red, green and blue light sources with time in an existing technique.

BEST MODE FOR CARRYING OUT THE INVENTION

Figure 1:
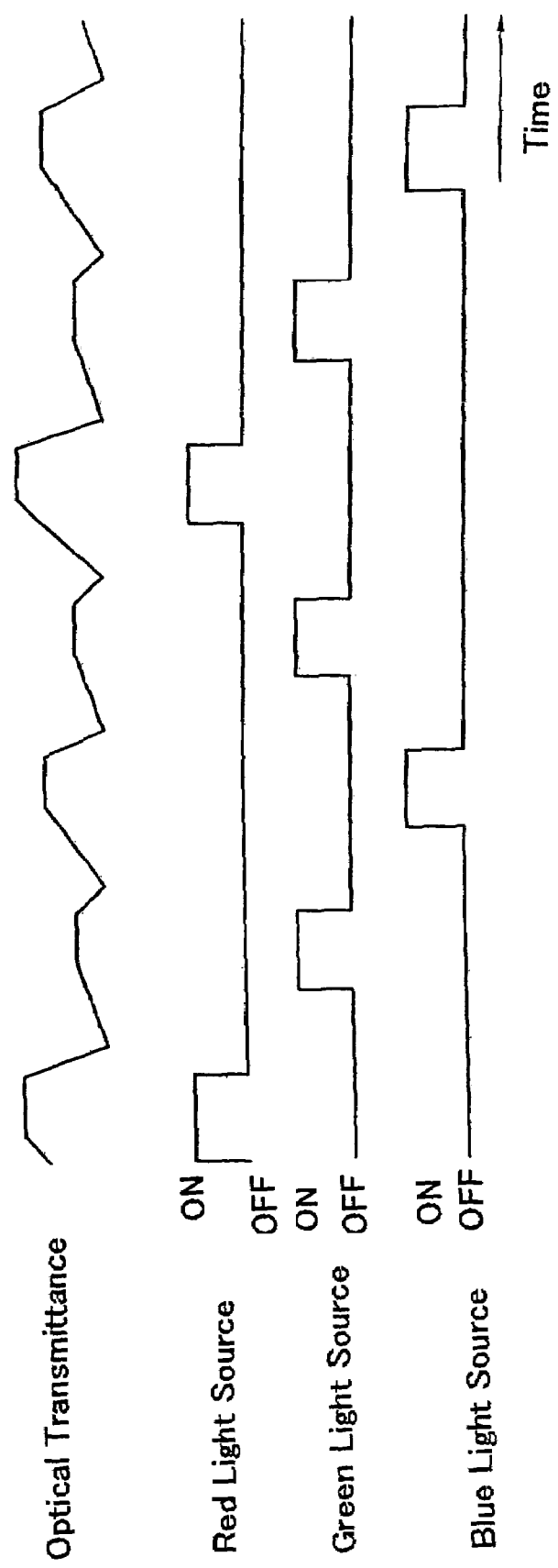
FIG. 1 is a diagram that shows changes of optical transmittance of display elements and ON/OFF actions of red, green and blue light sources with time according to an embodiment of the invention.

FIG. 1 is a diagram that shows changes of optical transmittance of display elements and ON/OFF actions of red, green and blue light sources with time in a preferred embodiment of the invention.

This embodiment is an application of the invention to field sequential color representation. Examples of products of this application include liquid crystal displays of projectors and head-mounted displays, among others.

As is already known, the field sequential color display technique uses three colored light sources for red, blue and green, respectively, and monochromatic display elements capable of representing data while switching the data in synchronism with ON/OFF action of the respective light sources.

The existing techniques turn red, green and blue light sources ON and OFF respectively once in each unit period. However, the preferred embodiment shown here turns ON the green light source twice within the unit period such that lighting red→green→blue→green makes the unit period, and the unit period is repeated to turn ON and OFF the light sources in the order of, for example, red→green→blue→green→red→green→blue . . . as shown in FIG. 1. Therefore, in case of this embodiment, the green lighting cycle is one half that of the existing techniques.

The preferred embodiment shown here is based on the Inventor's knowledge that the critical frequency for users to sense flickers largely varies with color, namely, among red, green and blue. More specifically, with regard to red and blue, users will become insensitive to flickers when the ON/OFF frequency of their light sources reaches approximately 30 Hertz. In the case of green, however, users will sense flickers up to the ON/OFF frequency of approximately 60 Hertz. That is, it is known that human eyes are more sensitive to flickers of green light more than red and blue light and therefore sense flickers of green light up to a frequency approximately twice that of red and blue light.

In the preferred embodiment shown here, lighting red→green→blue→green or lighting blue→green→red→green makes the unit period. If this period is 1/30 second, for example, then the ON/OFF frequency of red and blue is 30 Hertz, and the ON/OFF frequency of green is 60 Hertz. As explained above, these values are effective ON/OFF frequencies for rendering users insensitive to flickers for respective colors. Thus the switching rate of the monochromatic display elements may be 1/120 second.

That is, the preferred embodiment of the invention can slow down the display-switching rate of the monochromatic display elements from 1/180 second that has been considered the limit for insensitivity to flickers with the existing techniques. Therefore, even when the display elements are enhanced in resolution and their operative temperature range is enlarged, flickers observed by human eyes can be prevented effectively. Additionally, since the switching frequency of the display elements may be lower, it contributes to saving the power consumption.

Even when the ON/OFF order of the light sources is red→green→green→blue→red→green→green→blue→red . . . or blue→green→green→red→blue→green→green→red→blue . . . , substantially the same effect as the above-explained lighting of red→green→blue→green as each unit period can be obtained.

The invention claimed is:

1. A color display device for color representation by combining periodical repetition of ON/OFF switching of three light sources for red, green and blue colors, respectively, with representation of data corresponding to respective colors by display elements in synchronism with the ON/OFF switching of said three light sources, comprising:
means for switching the green light source on and off plural times in each unit period and effecting a single occurrence of ON/OFF switching of the red light source and a singular occurrence of ON/OFF switching of the blue light source in each unit period, wherein each occurrence of the ON period for the green light and the ON period for the red and blue lights in the unit period has an equal field period.

2. The color display device according to claim 1, wherein the green light source is turned on and off twice in each said unit period.

3. The color display device according to claim 2, wherein the red, green and blue light sources are controlled to turn on and off in the order of red, green, blue and green in each said unit period.

4. The color display device according to claim 2, wherein the red, green and blue light sources are controlled to turn on and off in the order of blue, green, red and green in each said unit period.

5. The color display device according to claim 1, wherein the display elements are monochromatic display elements of a reflection type.

6. The color display device according to claim 1, wherein the display elements are monochromatic display elements of a transmission type.

7. The color display device according to claim 1, wherein the color display device is a field sequential color display device.

8. The color display device according to claim 1, wherein the display elements are liquid crystal display elements.

9. The color display device according to claim 1, wherein the interval between OFF switching of any of the light sources and OFF switching of the light source of the next color is constant.

10. The color display device according to claim 1, wherein only the red, green and blue light sources are subjected to ON/OFF switching.

11. The color display device according to claim 1, wherein the green light source has consecutive ON/OFF switching in each unit period.

12. A field sequential color display device for color representation by combining periodical repetition of ON/OFF switching of three light sources for red, green and blue colors, respectively, with representation of data corresponding to respective colors by display elements in synchronism with the ON/OFF switching of said three light sources, comprising:
means for ON/OFF switching of the green light source at twice the frequency of ON/OFF switching of each of the red light source and the blue light source, wherein each occurrence of the ON period for the green light and the ON period for the red and blue lights in the unit period has an equal field period.

13. The field sequential color display device according to claim 12, wherein the display elements are liquid crystal display elements.

14. The field sequential color display device according to claim 12, wherein only the red, green and blue light sources are subjected to ON/OFF switching.

15. The field sequential color display device according to claim 12, wherein the green light source has consecutive ON/OFF switching in each unit period.

16. A color display method for color representation by controlling display elements to display data of respective colors in synchronism with ON/OFF switching of three light sources for red, green and blue colors, respectively, which is repeated periodically, comprising the steps:
turning the green light source on and off plural times in each unit period and effecting a singular occurrence of ON/OFF switching of the red light source and a singular occurrence of ON/OFF switching of the blue light source in each unit period, wherein each occurrence of the ON period for the green light and the ON period for the red and blue lights in the unit period has an equal field period.

17. The color display method according to claim 16, wherein the green light source is turned on and off twice in each said unit period.

18. The color display method according to claim 17, wherein the red, green and blue light sources are controlled to turn on and off in the order of red, green, blue and green in each unit period.

19. The color display method according to claim 17, wherein the red, green and blue light sources are controlled to turn on and off in the order of blue, green, red and green in each unit period and to repeat the unit period.

20. The color display method according to claim 16, wherein the method is a field sequential color display method.

21. The color display method according to claim 16, wherein the display elements are liquid crystal display elements.

22. The color display method according to claim 16, wherein the interval between OFF switching of any of the light sources and OFF switching of the light source of the next color is constant.

23. The color display method according to claim 16, wherein only the red, green and blue light sources are subjected to ON/OFF switching.

24. The color display method according to claim 16, wherein the green light source has consecutive ON/OFF switching in each unit period.

25. In a field sequential color display device for color representation by combining periodical repetition of ON/OFF switching of a red light source, a green light source and a blue light source, respectively, without color filters and with representation of data corresponding to respective colors by display elements in synchronism with ON/OFF switching of the three light sources, the improvement comprising:
means for switching the green light source on and off plural times in each unit period and effecting a single occurrence of ON/OFF switching of the red light source and a single occurrence of ON/OFF switching of the blue light source in each unit period, wherein each occurrence of the ON period for the green light and the ON period for the red and blue lights in the unit period has an equal field period.

26. The field sequential color display device of claim 25, wherein the green light source has consecutive ON/OFF switching in each unit period.

27. In a color display method for color representation by a field sequential color display by combining periodical repetition of ON/OFF switching of a red light source, a green light source and a blue light source, respectively, without color filters and with representation of data corresponding to respective colors by display elements in synchronism with ON/OFF switching of the three light sources, the improvement comprising the steps of:
turning the green light source on and off plural times in each unit period and effecting a single occurrence of ON/OFF switching of the red light source and a single occurrence of ON/OFF switching of the blue light source in each unit period, wherein each occurrence of the ON period for the green light and the ON period for the red and blue lights in the unit period has an equal field period.

28. The color display method of claim 27, comprising the step of conducting consecutive ON/OFF switching of the green light source in each unit period.

* * * * *